US010041621B1

(12) United States Patent
Allen et al.

(10) Patent No.: US 10,041,621 B1
(45) Date of Patent: Aug. 7, 2018

(54) FIRE TUBE WRAP

(71) Applicants: Derek Allen, Fairview, MT (US); Dillon Allen, Rigby, ID (US); David Allen, Rigby, ID (US)

(72) Inventors: Derek Allen, Fairview, MT (US); Dillon Allen, Rigby, ID (US); David Allen, Rigby, ID (US)

( * ) Notice: Subject to any disclaimer, the term of this patent is extended or adjusted under 35 U.S.C. 154(b) by 0 days.

(21) Appl. No.: 15/725,551

(22) Filed: Oct. 5, 2017

Related U.S. Application Data

(60) Provisional application No. 62/509,524, filed on May 22, 2017.

(51) Int. Cl.

| | |
|---|---|
| ***F16L 55/00*** | (2006.01) |
| ***F16L 58/08*** | (2006.01) |
| ***C10G 33/04*** | (2006.01) |
| ***B01D 17/04*** | (2006.01) |
| *F16L 9/18* | (2006.01) |

(52) U.S. Cl.
CPC ............ *F16L 58/08* (2013.01); *B01D 17/042* (2013.01); *C10G 33/04* (2013.01); *F16L 9/18* (2013.01)

(58) Field of Classification Search
CPC ................................ F16L 57/00; F16L 57/04
USPC ....... 138/110, 156, 158, 161, 167, 168, 171, 138/99
See application file for complete search history.

(56) References Cited

U.S. PATENT DOCUMENTS 3,495,629 A * 2/1970 Lionikis .............. B29C 67/0011 138/110
3,916,955 A * 11/1975 Netterstedt ............. F16L 57/00 138/151
4,502,370 A * 3/1985 Baileys ................... F16L 59/07 110/184
4,776,790 A * 10/1988 Woodruff .............. F16L 3/1226 122/DIG. 13
5,722,463 A * 3/1998 Smyth ..................... F16L 55/17 138/158
5,960,602 A * 10/1999 Goss ....................... F16L 59/14 138/158
6,386,131 B1 * 5/2002 Barsoum ................... B63B 3/00 114/357
7,066,210 B2 * 6/2006 Kakoschke ........... F16L 55/172 138/167
7,950,418 B2 * 5/2011 Wolf .................. F16L 55/1683 138/157
9,371,768 B2 * 6/2016 Yamanari ................ F01N 13/08
2015/0167887 A1 * 6/2015 Roberts .................. B21D 47/04 138/158

* cited by examiner

*Primary Examiner* — Patrick F Brinson
(74) *Attorney, Agent, or Firm* — Schmeiser, Olsen & Watts LLP

(57) ABSTRACT

Disclosed are protective wraps for fire tubes in heater treaters which reduce corrosion of the fire tubes. A protective wrap for a fire tube in a heater treater having at least one sheet of corrosion resistant material bent around at least a portion of the fire tube, and wherein the sheet of corrosion resistant material is coupled to the fire tube. The protective wrap may be coupled to the fire tube through the use of bands, welding or the like. The protective wrap may be formed from a variety of types of stainless steel or other corrosion resistant material.

20 Claims, 14 Drawing Sheets

16
12
20
26
27
26
24
26
22
14
22
28

66
66
64
64
64
64
64
16
64
64
62
64
64
64
64
14
60

90
84
88
90

80
84
90
90
86
90
90
84
90
88
88
88
88
88
90
90
90
88
88
88
88
88
88
88
88
88
88

82
90
90
16
14
12

FIRE TUBE WRAP

CROSS REFERENCE TO RELATED APPLICATION[S]

This application claims priority to U.S. Provisional Patent Application entitled "FIRE TUBE ALTERATIONS," Ser. No. 62/509,524, filed May 22, 2017, the disclosure of which is hereby incorporated entirely herein by reference.

BACKGROUND OF THE INVENTION

Technical Field

This invention relates to a corrosion resistant wrap for fire tubes used in vertical or horizontal heater treaters in order to decrease corrosion and extend the lives of the tubes.

State of the Art

In the oil and gas industry, it is necessary to separate oil from salt water and other unwanted contaminants prior to shipping the oil to a refinery. One of the devices used to separate oil from salt water and unwanted contaminants is a heater treater. At an oil field, the oil is pumped from the ground and directly or indirectly into a heater treater. A heater treater uses heat, pressures and chemicals in order to separate unwanted fluids and materials from oil.

A heater treater is a tank containing a heat source. This heat source is contained in a tube called a fire tube.

A fire tube is a large u-shaped metal pipe that is placed in the heater treater and submerged in the oil and water mixture. Typically a fire tube is made from steel pipe ranging in diameter from 12 inches to 24 inches and has a length of 4 feet to 15 feet.

One end of the fire tube contains a heat source such as a burner with an open flame. The other end of the fire tube is connected to a chimney stack for venting exhaust. The fire tube prevents the flame or heating element from direct contact with the oil and water mixture.

Due to the fact that the fire tube is immersed in highly corrosive salt water, fire tubes tend to pit and corrode very quickly. Additionally, fire tubes are exposed to heat which accelerates this corrosion.

If a fire tube degrades too much, significant salt water spills, oil spills, fires or accidents may occur. Therefore, it is very important to replace fire tubes before they fail.

Presently fire tubes are simply replaced when they become too corroded or begin to leak. This can be costly as fire tubes can corrode in as little time as a few months. Additionally, production time is lost when the tubes are replaced.

Accordingly, alterations to fire tubes are needed in order to extend the life of the tubes and reduce cost.

SUMMARY OF EMBODIMENTS

The present invention discloses a protective wrap for a fire tube which makes it more corrosion resistant.

Disclosed is a protective wrap for a fire tube including a fire tube in a heater treater, at least one sheet of corrosion resistant material bent around at least a portion of the fire tube, and wherein the sheet of corrosion resistant material is coupled to the fire tube.

Alternate embodiments may include a protective wrap for a fire tube having a fire tube in a heater treater, a corrosion resistant member shaped to encompass at least a portion of the fire tube, and wherein the corrosion resistant member is coupled to the fire tube.

Additional embodiments of a protective wrap for a fire tube include a fire tube in a heater treater and a corrosion resistant material coupled to at least a portion of the fire tube.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Embodiments of this invention disclose a corrosion resistant wrap for a fire tube in a heater treater which reduces or prevents failures due to corrosion. In the gas and oil industry, heater treaters are used to separate oil from water and other contaminants. This is done by adding heat, pressure and chemicals to the mixture.

For the purposes of this disclosure, the following terminology has the following meanings. Super Duplex Stainless Steel is a stainless steel formed from an approximately 50/50 mixture of austenitic and ferritic phases and are sometimes referred to as austenitic-ferritic stainless steels. Zeron® 100 is Zeron® 100, Super Duplex Stainless Steel, a form of stainless steel developed and sold by Rolled Alloys which is extremely heat and corrosion resistant. Austenitic stainless steels are stainless steels which contain high amounts of chromium and nickel and have a face-centered crystalline structure.

Figure 1:
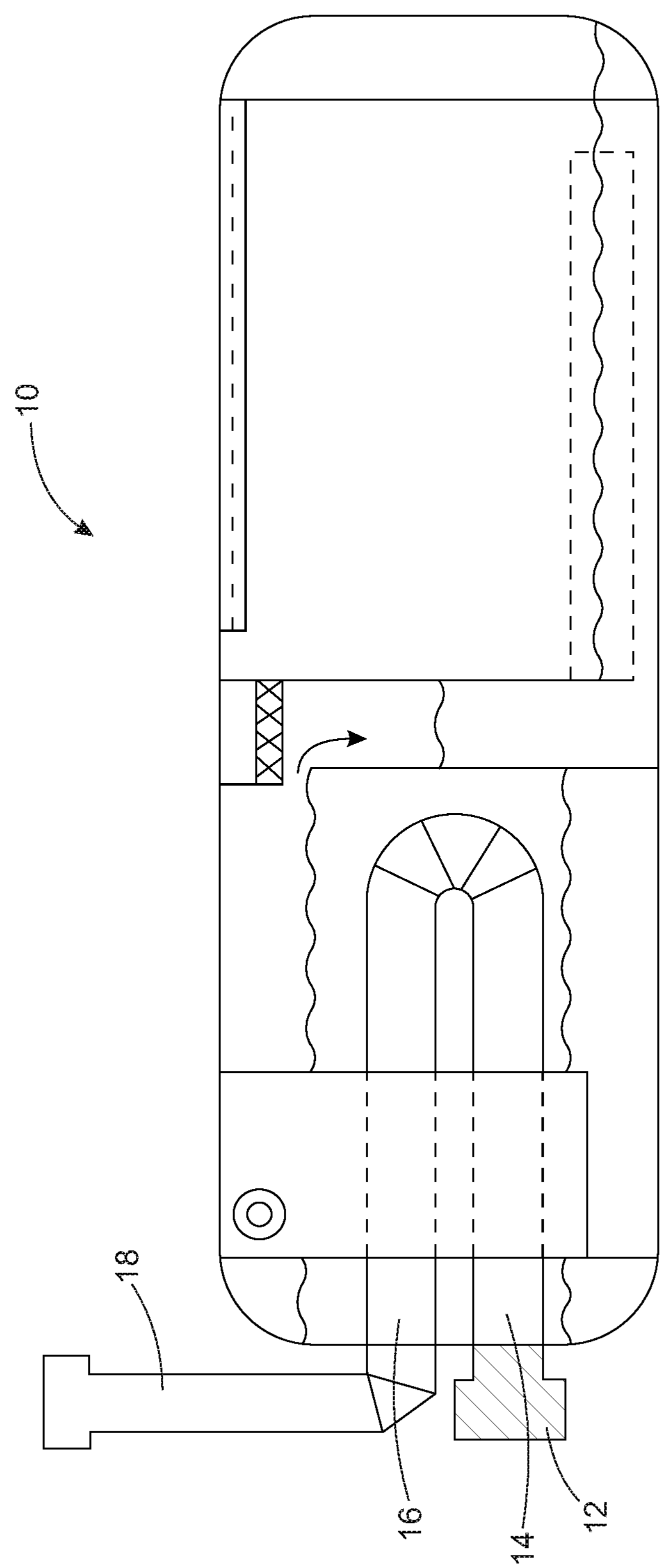
FIG. 1 is a side cross-sectional view of a heater treater as per the prior art.
Figure 2:
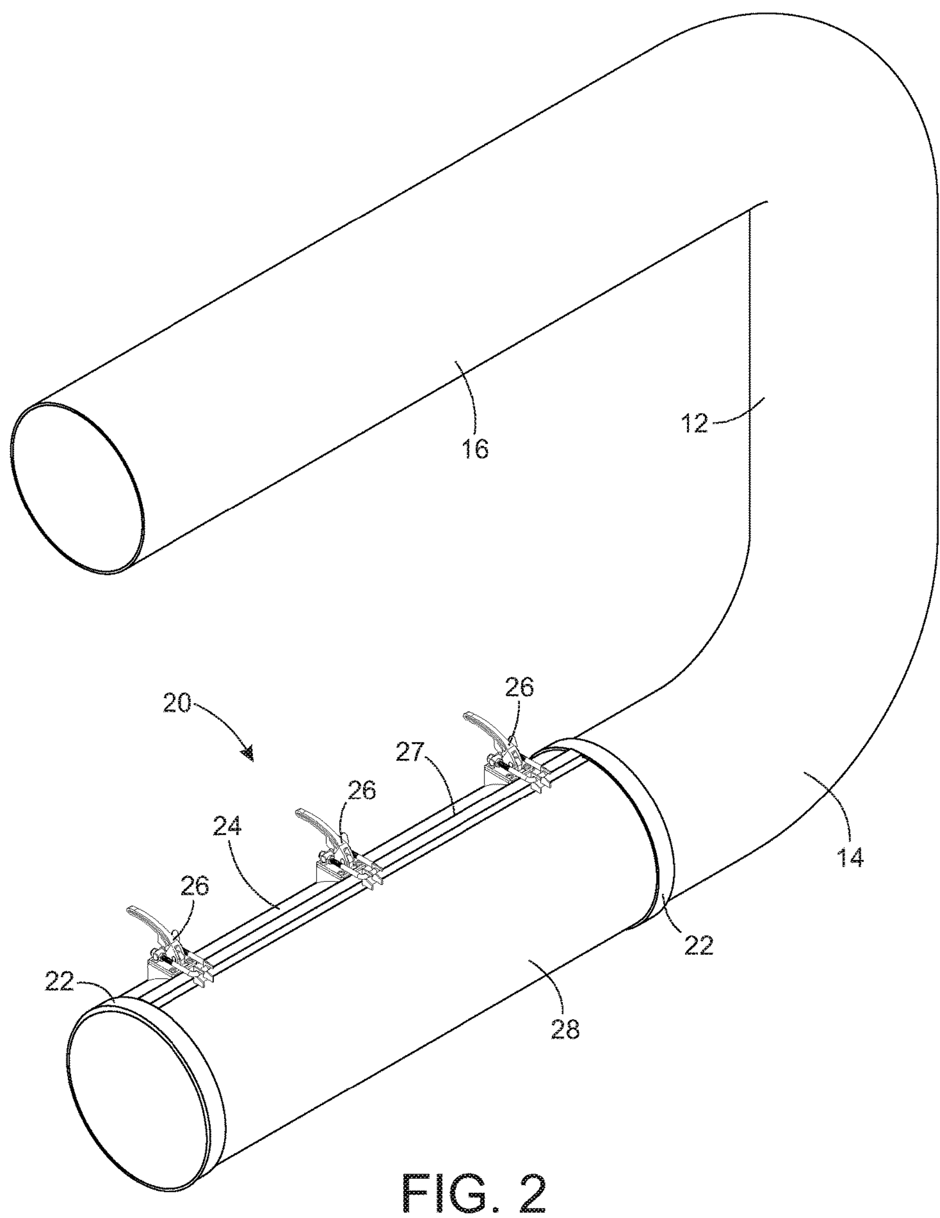
FIG. 2 is an isometric view of a fire tube having a first embodiment of a wrap for a fire tube.
Figure 3:
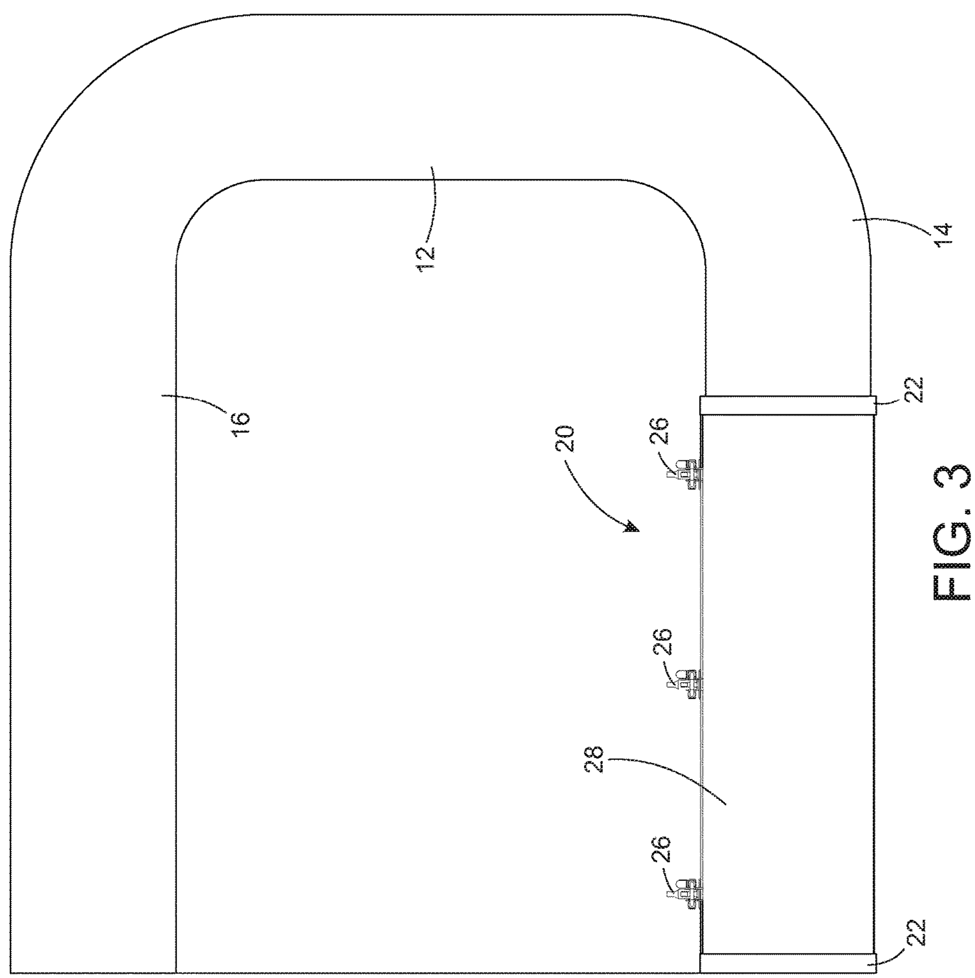
FIG. 3 is a side view of a fire tube having a first embodiment of a wrap for a fire tube.
Figure 4:
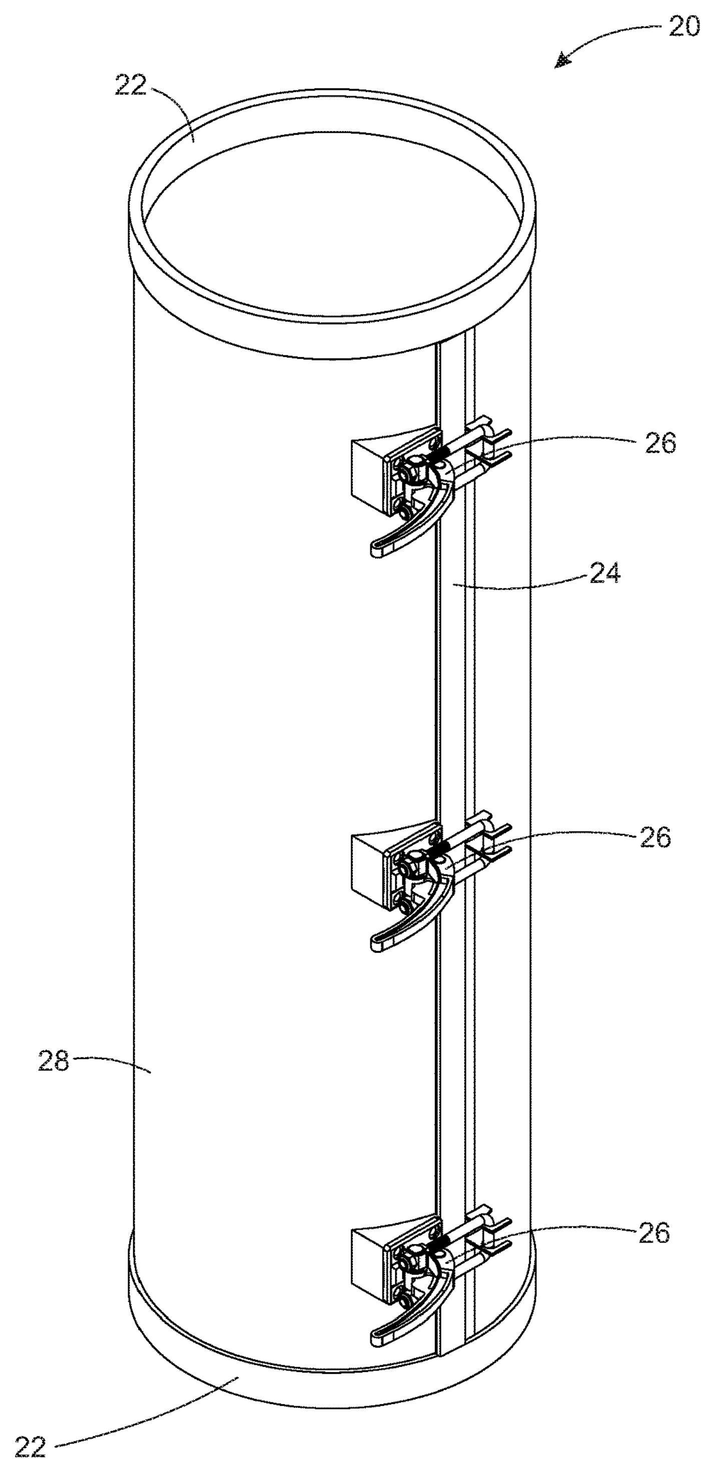
FIG. 4 is an isometric view of a first embodiment of a wrap for a fire tube.
Figures 5, 6:
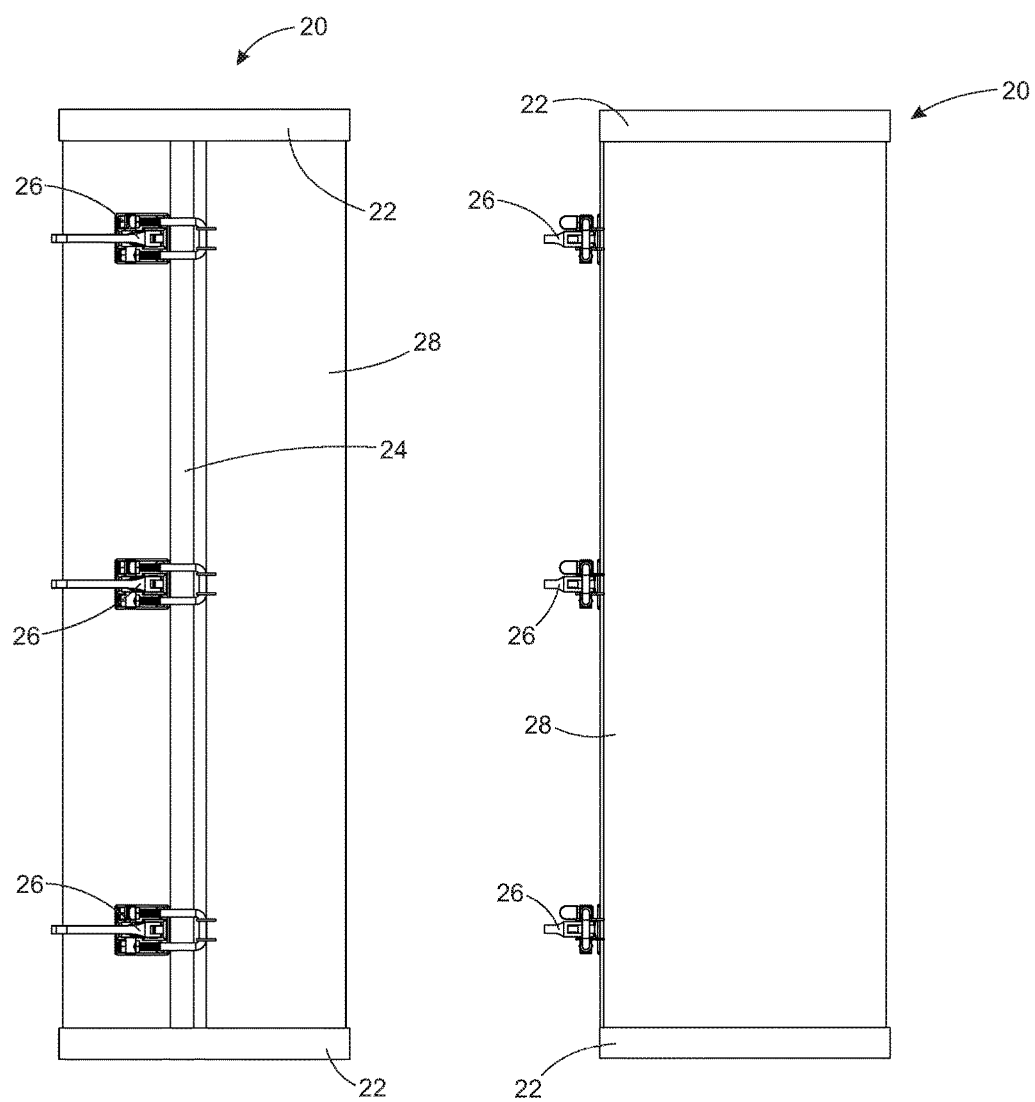
FIG. 5 is a top view of a first embodiment of a wrap for a fire tube.
FIG. 6 is a side view of a first embodiment of a wrap for a fire tube.
Figure 7:
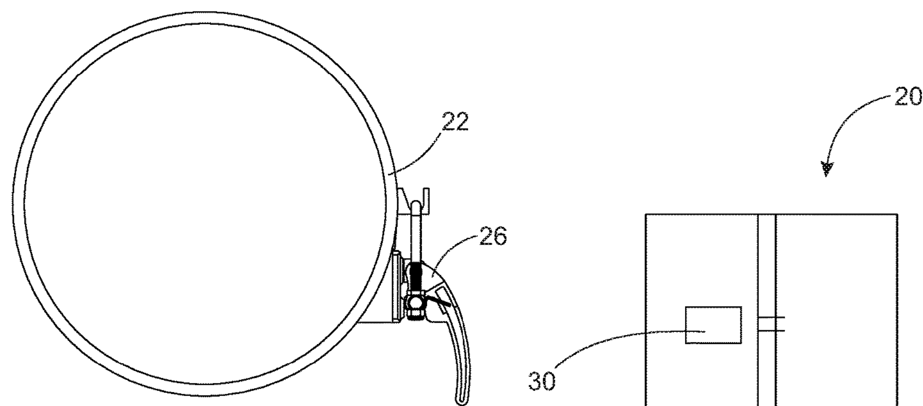
FIG. 7 is an end view of a first embodiment of a wrap for a fire tube.

FIG. 1 illustrates a prior art heater treater 10 having a fire tube 12. The heater treater 10 is a large tank. In the figure, the tank is oriented horizontally, however, the tank may also be oriented vertically.

The fire tube 12 is a U shaped pipe with a lower section 14 and an upper section 16. Heat enters the fire tube 12 at the lower section 14 and passes into the upper section 16 where it is vented at the exhaust pipe 18.

Heat may be provided to the fire tube 12 in many ways including a burner and the like. The heat provided to the fire tube 12 heats the oil, water and chemical mixture contained in the heater treater 10 causing the oil and water to separate.

FIGS. 2-9 illustrate a wrap 20 for wrapping around or covering a section of the fire tube. The wrap 20 is a sheet of stainless steel or other corrosion resistant material 28 which is wrapped around the fire tube 12 in order to prevent the salt water and other corrosive agents in the heater treater from acting on the fire tube 12. Wraps described herein may enclose 10 percent to 100 percent of a fire tube 12.

Corrosion resistant material 28 may include, but is not limited to, various types of stainless steel including Zeron® 100, Super Duplex stainless steel, modified stainless steel, hybrid stainless steel, blended stainless steel, austenitic stainless steel and the like. Additionally, other combinations of blended metals may also be used. Possible materials include but are not limited to: UNS S32760, UNS N08367, UNS N06625, UNS N06333, UNS N08330, UNS S30400, UNS S30900, UNS S31600, and UNS S31703.

The corrosion resistant material 28 may be a sheet of material bent to wrap around the fire tube 12 or else the corrosion resistant material 28 may be formed in some other way to protect the surface of the fire tube 12.

The corrosion resistant material 28 may be 1/16 inch, 1/8 inch or 1/4 inch in thickness, or any other standard or non-standard thickness of material.

In order to prevent liquid from getting between the sheet of corrosion resistant material 28 and the fire tube 12, a seal 22 at the ends of the corrosion resistant material 28 may be desirable along with a seal 24 at a seam 27 in the material 28. In some embodiments, this seal 22 and 24 may be formed from gasket material or else it may be formed form a sealant such as caulk, silicone or the like.

Clamps 26 or other closure devices may be used to couple the sheet material 28 to itself. The sheet material 28 is coupled to itself when it is wrapped around the fire tube 12 and the ends meet at a seam 27 the runs parallel to the length of the fire tube. Clamps 26, though illustrated as bolt clamps, may be any type of clamp that is strong enough to allow the sheet material 28 to be clamped around the entire circumference of the fire tube 12.

Additionally, three clamps 26 are illustrated in the figures, however, fewer or greater numbers of clamps 26 may be used in order to secure the wrap 20 around the fire tube 12.

Figure 8:
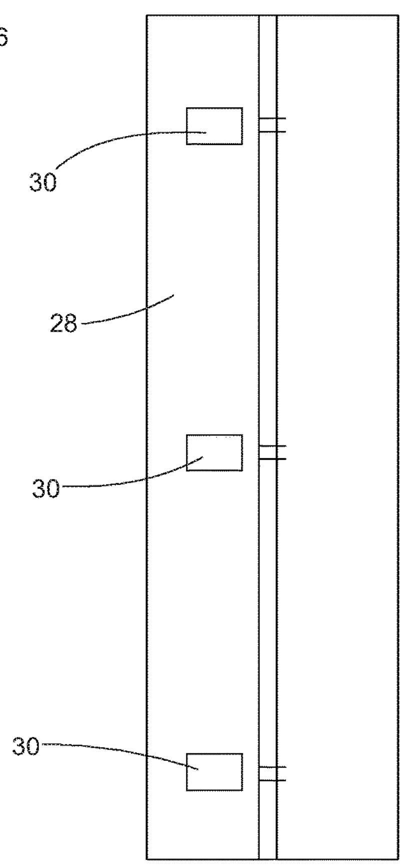
FIG. 8 is a top view of a first embodiment of a wrap for a fire tube without clamps.
Figure 9:
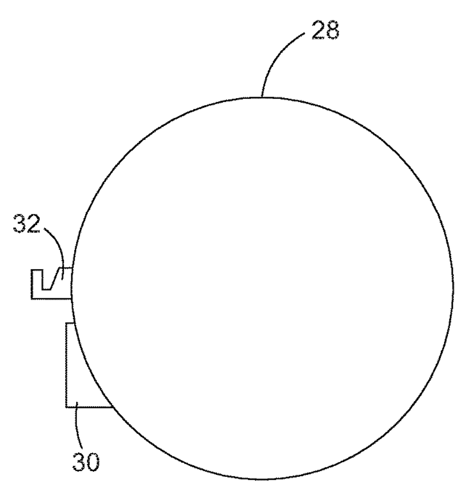
FIG. 9 is an end view of a first embodiment of a wrap for a fire tube without clamps.
Figure 10:
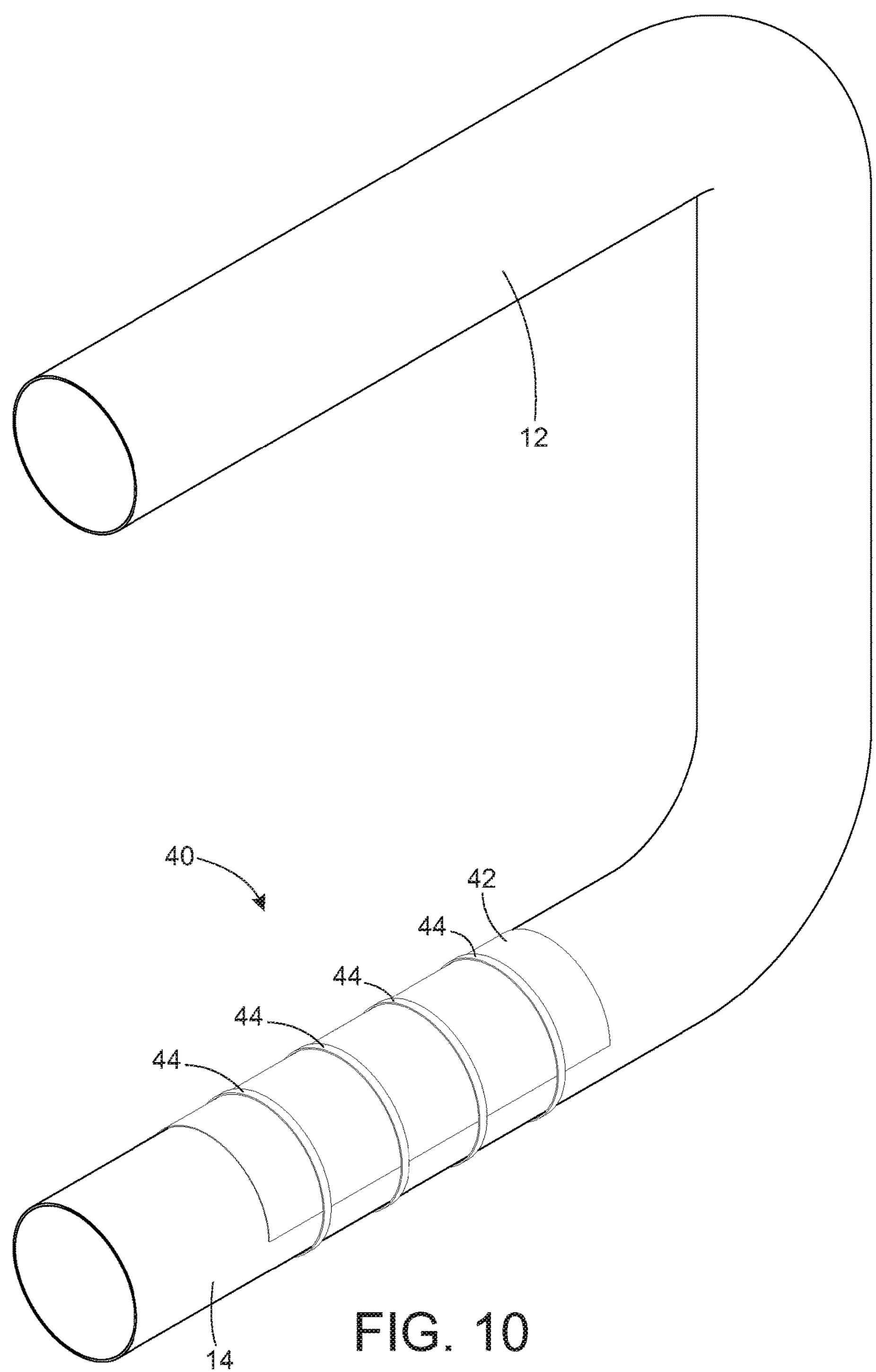
FIG. 10 is an isometric view of a fire tube with a second embodiment of a wrap for a fire tube.
Figure 11:
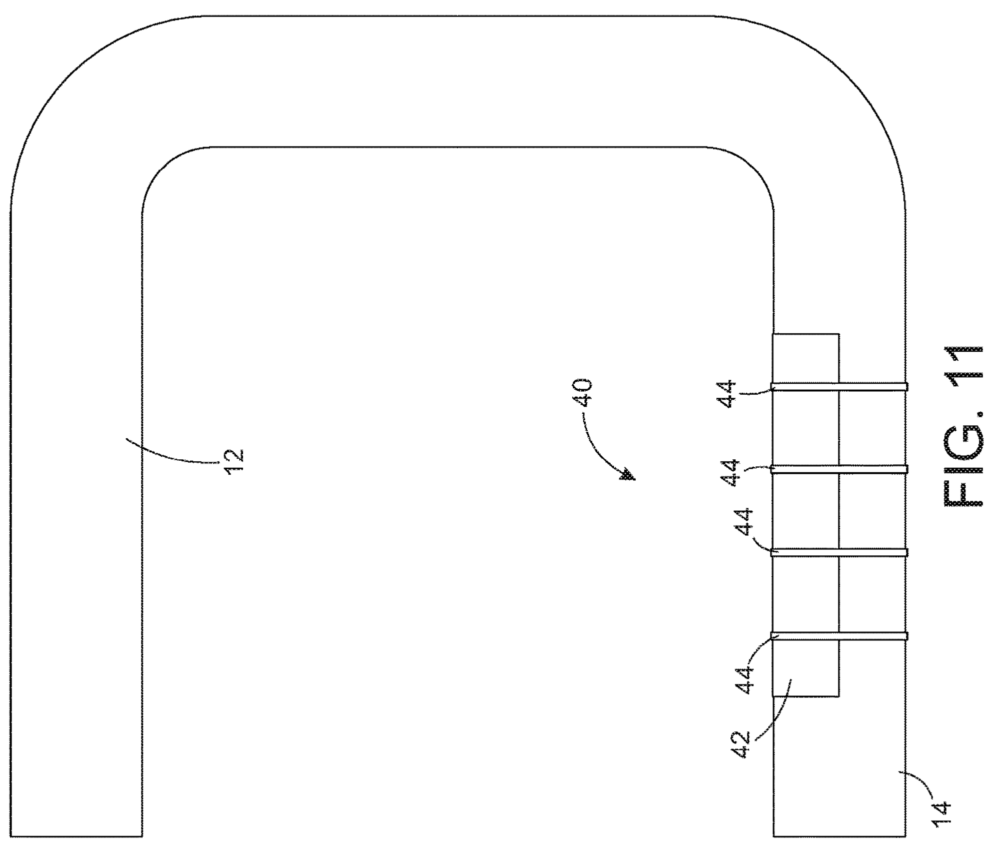
FIG. 11 is a side view of a fire tube with a second embodiment of a wrap for a fire tube.
Figure 13:
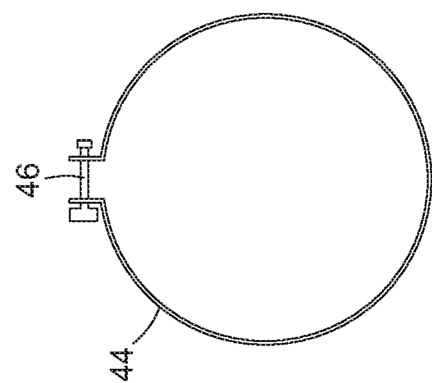
FIG. 13 is a side view of a band for use with a second embodiment of a wrap for a fire tube.
Figure 12:
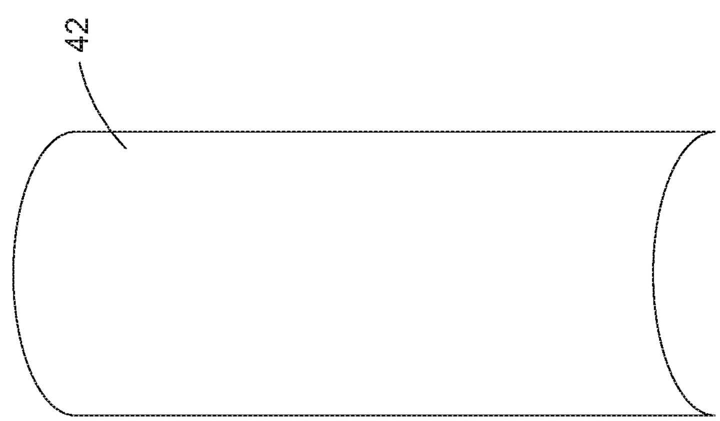
FIG. 12 is a top view of a second embodiment of a wrap for a fire tube.

FIGS. 8-9 illustrate the sheet material 28 without the clamps 26 and the seals 22 and 24. In these illustrations, clamp mounting locations 30 are illustrated. These clamp mounting locations 30 may be any necessary alterations to the sheet material 28 necessary to allow the clamps 26 to be mounted in place.

Additionally, clamp hook 32 is illustrated which is used if a bolt clamp is desired to secure the sheet material 28. The clamp hook 32 is what the bolt clamp hooks to in order to pull the sheet material 28 snuggly in place.

While the figures illustrate clamps 26 to couple the corrosion resistant material 28 to the fire tube 12, the corrosion resistant material 28 may be coupled to the fire tube 12 through welding, banding and/or strapping, bolts, screws, wire or multiple types of adhesive. Additionally, the corrosion resistant material 28 may be incorporated into the fire tubes' manufacturing.

Corrosion resistant material 28 may be welded directly to the fire tube 12 by means of arc welding, MIG or TIG welding, laser welding, or plasma welding using welding fillers recommended by the product manufacturers.

FIGS. 10-13 illustrate a second embodiment of a wrap 40 for a fire tube 12. This embodiment includes a partial wrap 40 or cap that is placed on the fire tube 12 on top of the lower section 14 of the pipe.

The partial wrap 40 is a piece of corrosion resistant material 42 which is bent in order to partially cover the fire tube 12. Corrosion resistant material 42 may include, but is not limited to, various types of stainless steel including Zeron® 100, Super Duplex stainless steel, modified stainless steel, hybrid stainless steel, blended stainless steel, austenitic stainless steel and the like. Additionally, other combinations of blended metals may also be used. Possible materials include but are not limited to: UNS S32760, UNS N08367, UNS N06625, UNS N06333, UNS N08330, UNS S30400, UNS S30900, UNS S31600, and UNS S31703.

The corrosion resistant material 42 may be 1/16 inch, 1/8 inch or 1/4 inch in thickness, or any other standard or non-standard thickness of material.

The partial wrap 40 may cover the top half, third or quarter of the lower portion 14 of the fire tube 12. The partial wrap 40 may encircle 10 percent, 25 percent, 50 percent, 75 percent or 100 percent of the circumference of the fire tube 12. The partial wrap 40 may encircle greater than or less than 50 percent of the circumference of the fire tube 12. The partial warp 40 may encircle 10 percent to 100 percent of the circumference of the fire tube 12. Alternatively, the partial wrap 40 may cover any percentage of the circumference of the fire tube 12 less than the entire circumference.

Additionally, the partial wrap 40 may cover between 10 percent and 100 percent of the entire fire tube 12.

Due to warm air rising, the heat in the fire tube 12 rises and heats the top of the lower portion 14 of the fire tube 12 in particular. Therefore, this portion of the pipe is the portion that corrodes most significantly during use.

Using a partial wrap 40 to cover just the top of the lower portion 14 of the fire tube 12 will help to prevent corrosion of the fire tube 12 and reduce the cost of the wrap.

The material 42 may be held in place using at least one band 44 which wraps around the material 42 and the entire circumference of the fire tube 12. The band 44 may be a thin strip of material wrapped around the fire tube 12. The band 44 may be formed from any type of material listed previously, including but not limited to, corrosion resistant material such as stainless steel, Zeron® 100, Super Duplex stainless steel, modified stainless steel, hybrid stainless steel, blended stainless steel or the like. The bands 44 may have a width of 1/2 inch to 2 1/2 inches or other similar width.

Though illustrated as having four bands 44, greater or fewer numbers of bands 44 may be used to secure the partial wrap 40 in place.

The bands 44 may be tightened by bolt 46 which is placed in openings in the ends of the bands 44. At least one of the openings in the ends of the bands 44 is threaded and by tightening the bolt 46 in the threaded opening, the band 44 is tightened around the fire tube 12.

The bands 44 may also be secured by bolts, clamps, pneumatic tensioners or strapping, wires, strap bands, separately fabricated fasteners or the like.

While the figures illustrate bands 44 to couple the corrosion resistant material 42 to the fire tube 12, the corrosion resistant material 42 may be coupled to the fire tube 12 through welding, banding and/or strapping, bolts, screws, wire or multiple types of adhesive. Additionally, the corrosion resistant material 42 may be incorporated into the fire tubes' manufacturing.

Corrosion resistant material 42 may be welded directly to the fire tube 12 by means of arc welding, MIG or TIG welding, laser welding, or plasma welding using welding fillers recommended by the product manufacturers.

Figure 14:
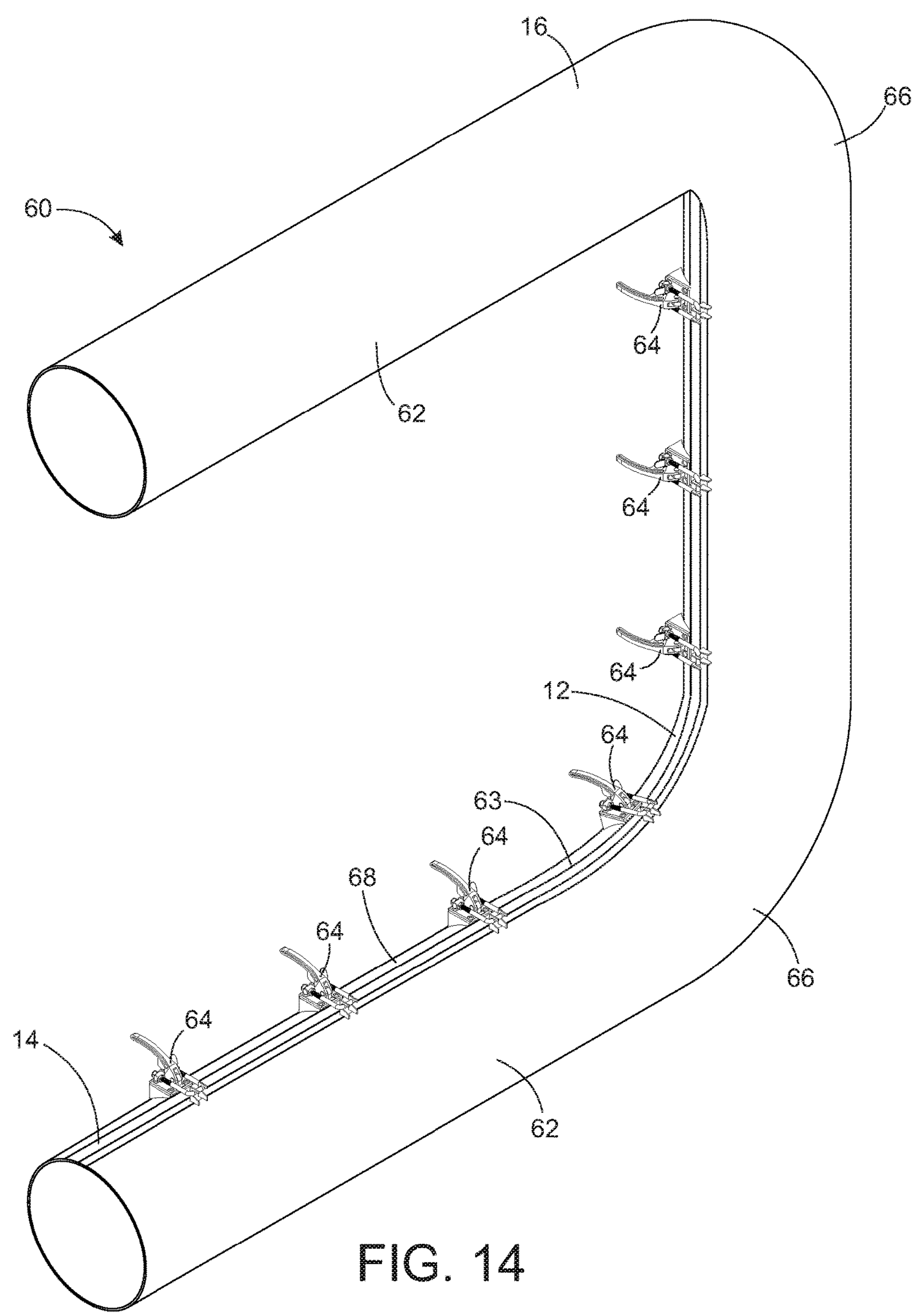
FIG. 14 is an isometric view of a fire tube with a third embodiment of a wrap for a fire tube.
Figure 15:
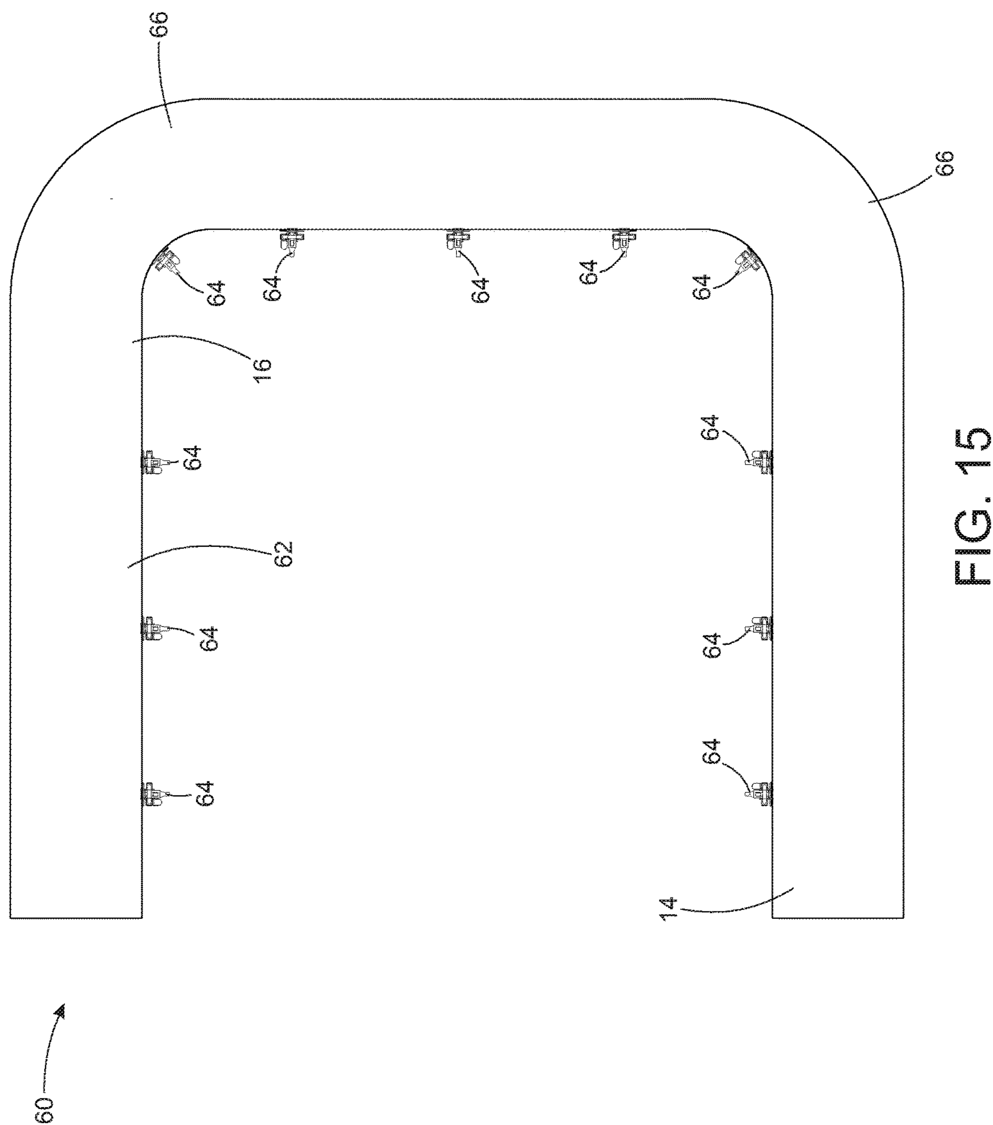
FIG. 15 is a side view of a fire tube with a third embodiment of a wrap for a fire tube.

FIGS. 14-15 illustrate a third embodiment of a wrap for protecting a fire tube from corrosion. The third embodiment of a wrap 60 for protecting a fire tube 12 from corrosion encloses the entire fire tube 12 including corners 66.

The wrap 60 is a sheet of corrosion resistant material 62 that is formed into the shape of a fire tube 12 in order to encompass and enclose the entire fire tube 12 and thereby protect the fire tube 12 from corrosion. The corrosion resistant material 62 may be a sheet of corrosion resistant material 62 bent to the shape of the fire tube 12 or it may be corrosion resistant material 62 that is formed in any other way desirable into a shape that encloses the fire tube 12.

The corrosion resistant material 62, unlike in previous embodiments, is bent at corners 66 in order to encompass the bends of the fire tube 12.

The corrosion resistant material 62 may be bent, forged or otherwise formed into corners 66 in order to surround the bends in the fire tube 12.

Corrosion resistant material 62 may include, but is not limited to, various types of stainless steel including Zeron® 100, Super Duplex stainless steel, modified stainless steel, hybrid stainless steel, blended stainless steel, austenitic stainless steel and the like. Additionally, other combinations of blended metals may also be used. Possible materials include but are not limited to: UNS S32760, UNS N08367, UNS N06625, UNS N06333, UNS N08330, UNS S30400, UNS S30900, UNS S31600, and UNS S31703.

The corrosion resistant material 62 may be 1/16 inch, 1/8 inch or 1/4 inch in thickness, or any other standard or non-standard thickness of material.

In order to prevent liquid from getting between the sheet of corrosion resistant material 62 and the fire tube 12, a seal 63 may be desirable along seam 68 in the material 62. In some embodiments, this seal 63 may be formed from gasket material or else it may be formed form a sealant such as caulk, silicone or the like.

Clamps 64 or other closure devices may be used to couple the sheet material 62 to itself. The sheet material 62 is coupled to itself when it is wrapped around the fire tube 12 and the ends meet at a seam 68 the runs parallel to the length of the fire tube 12. Clamps 64, though illustrated as bolt clamps, may be any type of clamp that is strong enough to allow the sheet material 62 to be clamped around the entire circumference of the fire tube 12.

Additionally, a limited number of clamps 64 are illustrated in the figures, however, fewer or greater numbers of clamps 64 may be used in order to secure the wrap 60 around the fire tube 12.

While the figures illustrate clamps 64 to couple the corrosion resistant material 62 to the fire tube 12, the corrosion resistant material 62 may be coupled to the fire tube 12 through welding, banding and/or strapping, bolts, screws, wire or multiple types of adhesive. Additionally, the corrosion resistant material 62 may be incorporated into the fire tubes' manufacturing.

Corrosion resistant material 62 may be welded directly to the fire tube 12 by means of arc welding, MIG or TIG welding, laser welding, or plasma welding using welding fillers recommended by the product manufacturers.

Figure 16:
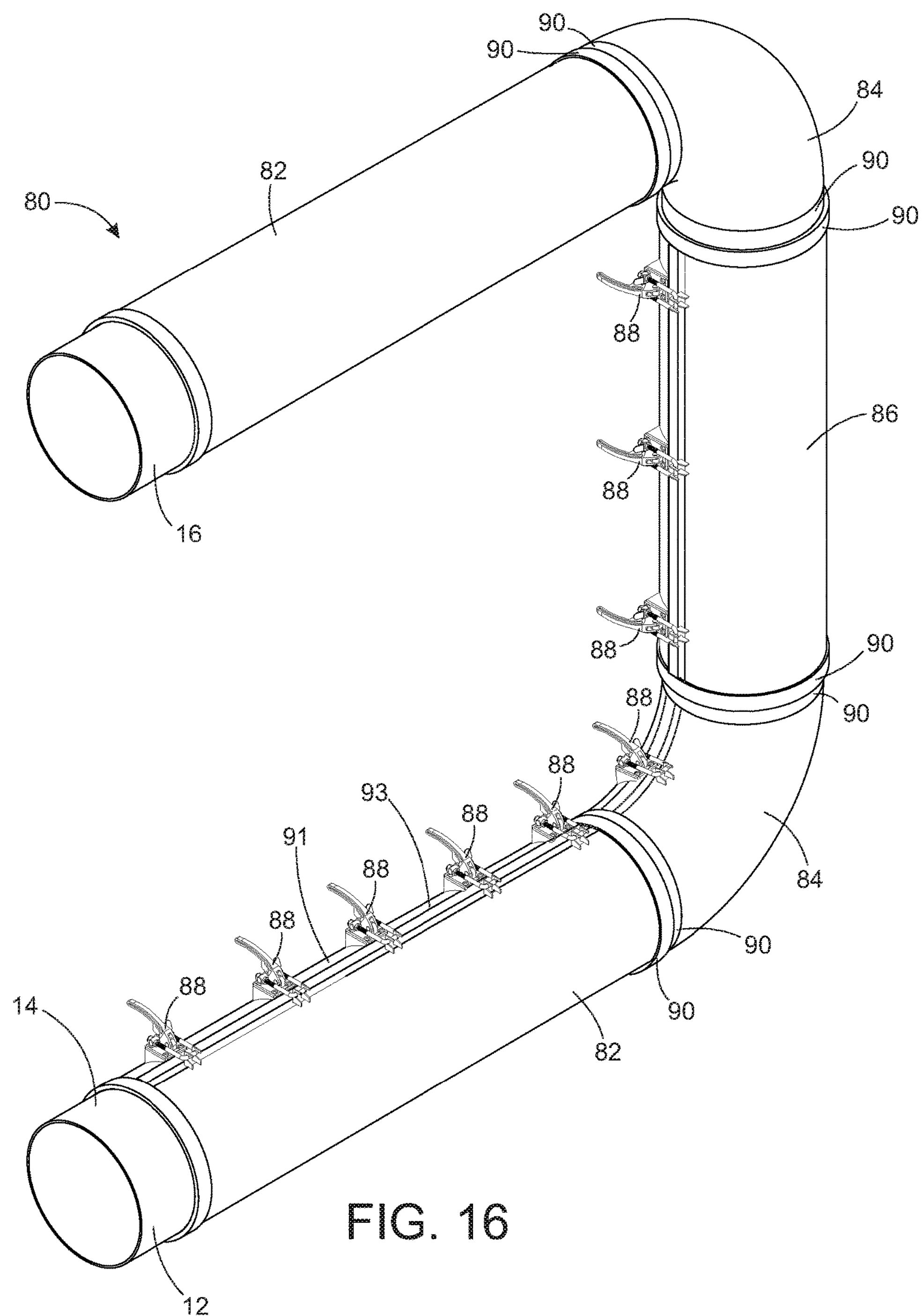
FIG. 16 is an isometric view of a fire tube with a fourth embodiment of a wrap for a fire tube.
Figures 17, 18:
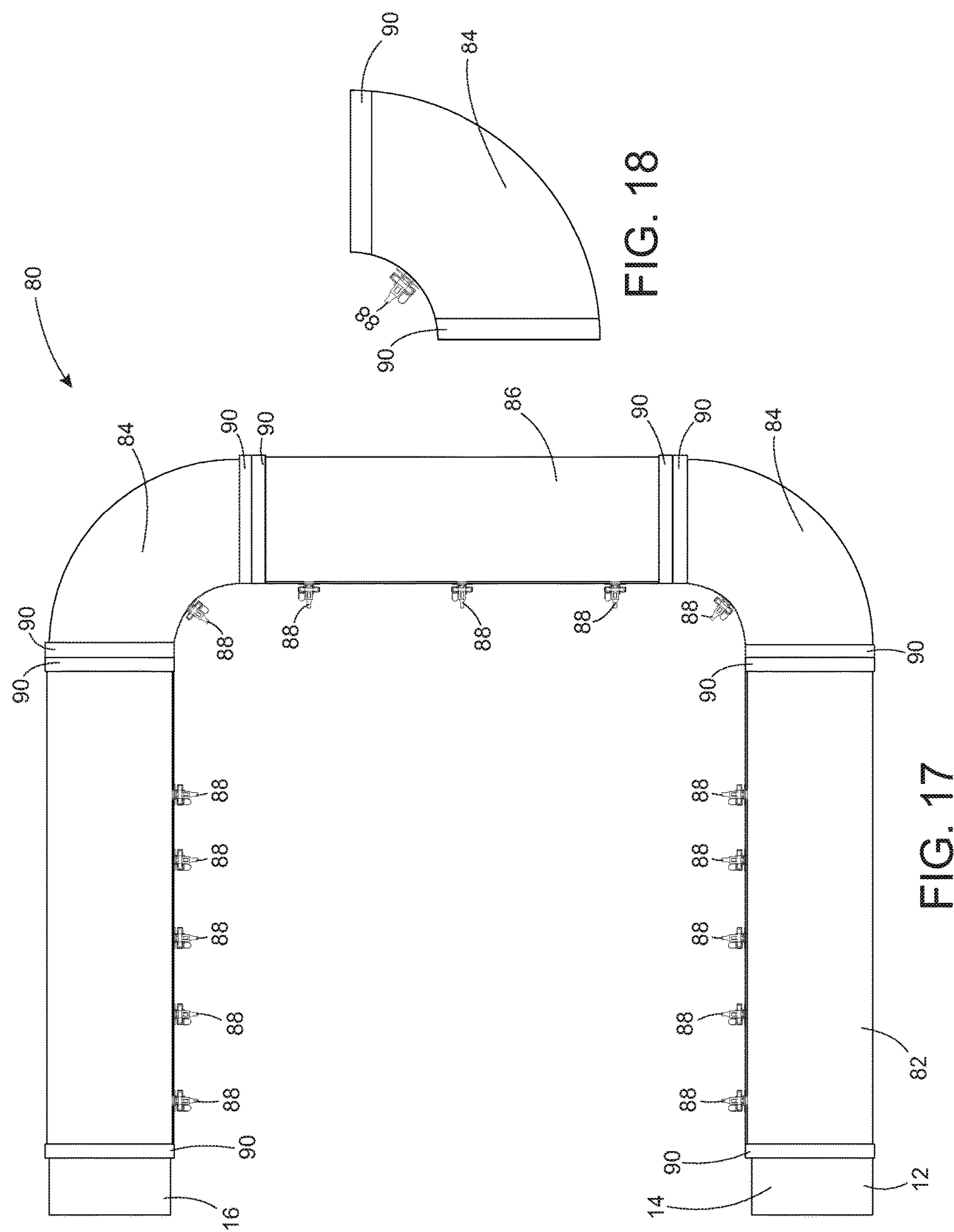
FIG. 17 is a side view of a fire tube with a fourth embodiment of a wrap for a fire tube.
FIG. 18 is a side view of a corner portion of a fourth embodiment of a wrap for a fire tube.

FIGS. 16-18 illustrate a fourth embodiment of a wrap for protecting a fire tube from corrosion. The wrap 80 involves multiple individual wraps which cover separate portions of the fire tube 12.

The wrap 80 is a sheet of stainless steel or other corrosion resistant material 82 which is wrapped around the fire tube 12 in order to prevent the salt water and other corrosive agents in the heater treater from acting on the fire tube 12.

Corrosion resistant material 82 may include, but is not limited to, various types of stainless steel including Zeron® 100, Super Duplex stainless steel, modified stainless steel, hybrid stainless steel, blended stainless steel, austenitic stainless steel and the like. Additionally, other combinations of blended metals may also be used. Possible materials include but are not limited to: UNS S32760, UNS N08367, UNS N06625, UNS N06333, UNS N08330, UNS S30400, UNS S30900, UNS S31600, and UNS S31703.

The corrosion resistant material 82 may be a sheet of material bent to wrap around the fire tube 12 or else the corrosion resistant material 82 may be formed in some other way to protect the surface of the fire tube 12.

The corrosion resistant material 82 may be 1/16 inch, 1/8 inch or 1/4 inch in thickness, or any other standard or non-standard thickness of material.

In order to prevent liquid from getting between the sheet of corrosion resistant material 82 and the fire tube 12, a plurality of seals 90 at the ends of the corrosion resistant material 82 may be desirable along with seals 91 at seams 93 in the material 82. In some embodiments, seals 90 and 91 may be formed from gasket material or else they may be formed form a sealant such as caulk, silicone or the like.

Clamps 88 or other closure devices may be used to couple the sheet material 82 to itself. The sheet material 82 is coupled to itself when it is wrapped around the fire tube 12 and the ends meet at seams 93 that run parallel to the length of the fire tube 12. Clamps 88, though illustrated as bolt clamps, may be any type of clamp that is strong enough to allow the sheet material 82 to be clamped around the entire circumference of the fire tube 12.

Additionally, a limited number of clamps 88 are illustrated in the figures, however, fewer or greater numbers of clamps 88 may be used in order to secure the wrap 80 around the fire tube 12.

While the figures illustrate clamps 88 to couple the corrosion resistant material 82 to the fire tube 12, the corrosion resistant material 82 may be coupled to the fire tube 12 through welding, banding and/or strapping, bolts, screws, wire or multiple types of adhesive. Additionally, the corrosion resistant material 82 may be incorporated into the fire tubes' manufacturing.

Corrosion resistant material 82 may be welded directly to the fire tube 12 by means of arc welding, MIG or TIG welding, laser welding, or plasma welding using welding fillers recommended by the product manufacturers.

While most of the sections of wrap 80 will be similar or identical to the wrap 20 of FIGS. 2-9, the corner wraps 84 as illustrated in FIG. 18 are different than the wraps discussed previously. Corner wraps 84 are pieces of corrosion resistant material 82 which are bent in order to enclose the corner portions of the fire tube 12. Corner wraps 84 are bent in order to encircle the cylindrical shape of the fire tube 12 and then they are also formed into a curve which is similar or identical to the curve of the corners of the fire tube 12.

Corner wraps 84 also have seals 90 and 91 such as the seals discussed previously and clamps 88 or other type of coupler in order to keep the corner wraps 84 secured around the fire tube 12.

Additionally, a wrap 86 is used for the vertical portion of the fire tube 12. Wrap 86 may also have clamps 88 and seals 90 and 91 similar to the other sections of wrap 80 discussed.

Figure 19:
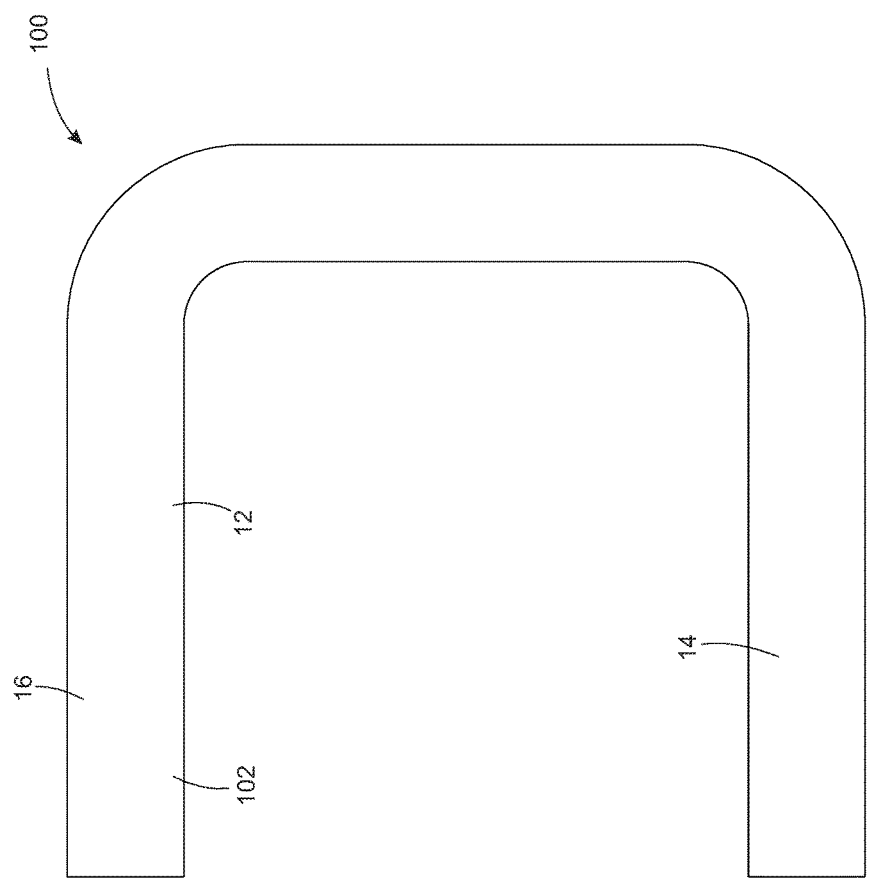
FIG. 19 is a side view of a fire tube with a fifth embodiment of a wrap for a fire tube.

FIG. 19 illustrates a fifth embodiment of a wrap for protecting a fire tube from corrosion. Wrap 100 includes a layer of corrosion resistant material 102 coupled to the surface of the fire tube 12.

Corrosion resistant material 102 may include, but is not limited to, various types of stainless steel including Zeron® 100, Super Duplex stainless steel, modified stainless steel, hybrid stainless steel, blended stainless steel, austenitic stainless steel and the like. Additionally, other combinations of blended metals may also be used. Possible materials include but are not limited to: UNS S32760, UNS N08367, UNS N06625, UNS N06333, UNS N08330, UNS S30400, UNS S30900, UNS S31600, and UNS S31703.

The corrosion resistant material 102 may be 1/16 inch, 1/8 inch or 1/4 inch in thickness, or any other standard or non-standard thickness of material.

The corrosion resistant material 102 may be coupled to the surface of the fire tube 12 through welding, banding and/or strapping, bolts, screws, wire or multiple types of adhesive. Additionally, the corrosion resistant material 102 may be incorporated into the fire tubes' manufacturing.

Corrosion resistant material 102 may be welded directly to the fire tube 12 by means of arc welding, MIG or TIG welding, laser welding, or plasma welding using welding fillers recommended by the product manufacturers.

Accordingly, for the exemplary purposes of this disclosure, the components defining any embodiment of the invention may be formed as one piece if it is possible for the components to still serve their function. The components may also be composed of any of many different types of materials or combinations thereof that can readily be formed into shaped objects provided that the components selected are consistent with the intended mechanical operation of the invention.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation.

What is claimed is:

1. A protective wrap for a fire tube comprising:

a fire tube in a heater treater, wherein the fire tube is at least partially submerged within an oil, water and chemical mixture within the heater treater;

at least one sheet of corrosion resistant material bent around at least a portion of said fire tube; and wherein said sheet of corrosion resistant material is coupled to said fire tube, and wherein heat transfers from the fire tube to the oil, water and chemical mixture within the heater treater.

2. The protective wrap for a fire tube of claim 1, wherein said at least one sheet of corrosion resistant material is formed from modified, hybrid or blended stainless steel.

3. The protective wrap for a fire tube of claim 1, wherein said at least one sheet of corrosion resistant material is coupled to said fire tube by a band that circles said at least one sheet of corrosion resistant material and said fire tube.

4. The protective wrap for a fire tube of claim 1, wherein said at least one sheet of corrosion resistant material is coupled to said fire tube by welding.

5. The protective wrap for a fire tube of claim 1, wherein said at least one sheet of corrosion resistant material encircles fifty percent of a circumference of said fire tube.

6. The protective wrap for a fire tube of claim 1, wherein said at least one sheet of corrosion resistant material is bent around an entire length of said fire tube.

7. The protective wrap for a fire tube of claim 1 wherein said at least one sheet of corrosion resistant material is bent around a portion of an entire length of said fire tube.

8. A protective wrap for a fire tube comprising:

a fire tube in a heater treater, wherein the fire tube is at least partially submerged within an oil, water and chemical mixture within the heater treater;

a corrosion resistant member shaped to encompass at least a portion of said fire tube; and wherein said corrosion resistant member is coupled to said fire tube, and wherein heat transfers from the fire tube to the oil, water and chemical mixture within the heater treater.

9. The protective wrap for a fire tube of claim 8, further comprising a plurality of bands for coupling said corrosion resistant member to said fire tube.

10. The protective wrap for a fire tube of claim 8, wherein said corrosion resistant member is coupled to said fire tube by welding.

11. The protective wrap for a fire tube of claim 8, wherein said corrosion resistant member is formed from a type of stainless steel.

12. The protective wrap for a fire tube of claim 8, wherein said corrosion resistant member encompasses less than fifty percent of a circumference of said fire tube.

13. The protective wrap for a fire tube of claim 8, wherein said corrosion resistant member extends over a portion of a length of said fire tube.

14. A protective wrap for a fire tube comprising:

a fire tube in a heater treater, wherein the fire tube is at least partially submerged within an oil, water and chemical mixture within the heater treater; and a corrosion resistant material coupled to at least a portion of said fire tube that is at least partially submerged within the oil, water and chemical mixture within the heater treater and heat transfers from the fire tube to the oil, water and chemical mixture within the heater treater.

15. The protective wrap of claim 14, wherein said corrosion resistant material encompasses an entire said fire tube.

16. The protective wrap of claim 14, wherein said corrosion resistant material is coupled to said fire tube by a plurality of bands.

17. The protective wrap of claim 14, wherein said corrosion resistant material is coupled to said fire tube by welding.

18. The protective wrap of claim 14, wherein said corrosion resistant material is a type of stainless steel.

19. The protective wrap of claim 14, wherein said corrosion resistant material is coupled to said at least a portion of said fire tube when said corrosion resistant material is coupled to itself around said fire tube.

20. The protective wrap of claim 14, wherein said corrosion resistant material encircles at least ten percent of a circumference of said fire tube.

* * * * *